(12) United States Patent
Lagger et al.

(10) Patent No.: US 11,072,500 B2
(45) Date of Patent: Jul. 27, 2021

(54) ROTARY TRANSFER INDEXING MACHINE

(71) Applicant: MIKRON SA AGNO, Agno (CH)

(72) Inventors: Luciano Lagger, Montagnola (CH);
Luca Giacobazzi, Cassano Valcuvia (IT)

(73) Assignee: MIKRON SA AGNO, Agno (CH)

( * ) Notice: Subject to any disclaimer, the term of this patent is extended or adjusted under 35 U.S.C. 154(b) by 0 days.

(21) Appl. No.: 16/329,917

(22) PCT Filed: Jul. 4, 2017

(86) PCT No.: PCT/EP2017/066600
§ 371 (c)(1),
(2) Date: Mar. 1, 2019

(87) PCT Pub. No.: WO2019/007481
PCT Pub. Date: Jan. 10, 2019

(65) Prior Publication Data
US 2020/0255231 A1      Aug. 13, 2020

(51) Int. Cl.
*B65G 47/84*      (2006.01)
*B23Q 39/04*      (2006.01)

(52) U.S. Cl.
CPC .......... *B65G 47/84* (2013.01); *B23Q 39/042* (2013.01)

(58) Field of Classification Search
CPC .... B23Q 39/042; B65G 47/84; B65G 47/841; B65G 47/842; B65G 47/843;
(Continued)

(56) References Cited

U.S. PATENT DOCUMENTS 1,396,781 A * 11/1921 Randles ............... B23Q 39/042
408/34
1,449,465 A * 3/1923 Hamersveld ......... B23Q 39/042
29/38 A
(Continued)

FOREIGN PATENT DOCUMENTS

| CN | 2760847 Y | 2/2006 |
| CN | 2827621 Y | 10/2006 |
| DE | 10136778 A1 | 7/2003 |

OTHER PUBLICATIONS

International Search Report dated Mar. 14, 2018 re: Application No. PCT/EP2017/066600, pp. 1-3, US 3 688 363 A, US 5 815 902 A and DE 101 36 778 A1.
(Continued)

*Primary Examiner* — Saul Rodriguez
*Assistant Examiner* — Brendan P Tighe
(74) *Attorney, Agent, or Firm* — Cantor Colburn LLP

(57) ABSTRACT

A rotary indexing transfer machine includes a machine frame; a rotating table, supported on the machine frame to rotate about an indexing axis; at least one workpiece carrying spindle having a hollow shaft for receiving a workpiece and a clamping device for clamping the workpiece inserted in the hollow shaft. The clamping device includes a collet is coupled to the workpiece carrying spindle. The workpiece carrying spindle is mounted on the rotating table, and the hollow shaft and collet are connected for joint rotation about a spindle rotation axis. The machine includes at least one support in fixed position next to the rotating table, at least one machining station with at least one machining unit supported on the support, to allow machining of the workpiece clamped in the collet. The machine includes at least
(Continued)

one drive motor mounted on the rotating table, an indexing device mounted on the machine frame, and an indexing component.

18 Claims, 17 Drawing Sheets

(58) Field of Classification Search
CPC .. B65G 47/844; B65G 47/845; B65G 47/846; B65G 47/847; B65G 47/848
See application file for complete search history.

(56) References Cited

U.S. PATENT DOCUMENTS

| | | | |
|---|---|---|---|
| 3,688,363 A * | 9/1972 | Eivind Christian Thobroe | ........... B23Q 39/042 29/38 A |
| 4,351,096 A | 9/1982 | Depweg et al. | |
| 5,815,902 A * | 10/1998 | Osterried | ............. B23Q 39/044 29/38 A |

OTHER PUBLICATIONS

Written Opinion dated Mar. 14, 2018 re: Application No. PCT/EP2017/066600, pp. 1-3, US 3 688 363 A and US 5 815 902 A.

* cited by examiner

ROTARY TRANSFER INDEXING MACHINE

TECHNICAL FIELD

The present disclosure relates to the field of the rotary transfer indexing machines.

In particular, the disclosure relates to a rotary transfer indexing machine according to the preamble of claim 1.

BACKGROUND

A known type of rotary transfer indexing machine is described, for example, in U.S. Pat. No. 4,351,096 that discloses a vertical multiple spindle lathe.

Machines of this known type are usually provided with an indexing table on which workpiece spindles are fixed. The workpiece spindles are generally provided with clamping devices for clamping workpieces. The clamping devices can be provided as fixed or rotating collets, depending on the shape of the workpiece to be clamped.

The table is surrounded by working stations provided with working tools located on positioning units fixed to the respective stations. The working stations are fixed with respect to the rotating table. In each station the workpiece, clamped in the workpiece spindle, is machined according to specific requirements.

When there is the need of rotating a workpiece around its axis, for its proper machining, the respective workpiece spindle is driven by a motor, which is part of the station and fixed to the latter.

Means for coupling the fixed motor in the station to the spindle on the table are provided, so as to allow transmission of the torque needed for rotating the workpiece spindle and therefore the workpiece.

The coupling means usually comprise an external spindle that moves axially, upwards or downwards, to couple with the workpiece spindle.

The external spindle and the shaft of the positioning device have coinciding rotation axes. The fixed motor is provided with a driving gear.

A first drawback of such an arrangement is that a precise coupling, both in terms of positioning and of torque transmission, is difficult and relatively costly.

Another drawback is that, in operation, after table positioning and indexing, the fixed motor in the station has to be coupled to the spindle mounted on the table, which requirement increases the duration of the operation cycle of the machine.

Another drawback is that the pieces to be worked have to be provided as blanks.

For this, a bar is previously cut into blanks that are thereafter fed to the spindles.

If an external shape of the part has to be completely machined, there are two options:

A first one is to provide the part which has to be machined with additional material length that is generally needed for clamping. Such additional length has to be thereafter separated and therefore scraps obtained from the separation are produced that may be economically relevant.

The second option is to only partially machine the part in a first clamping position. Then the part is overturned and clamped in a second position to complete the machining cycle.

In this case the drawback is that the working cycle is long, a supplementary machining unit being possibly needed. The working accuracy may also suffer due to the requirement for repeating operations, such as indexing.

In known machine structures only up to two machining units can be, and are usually provided at the station in which rotation of the workpiece is required. Such machining units perform their operations either axially, from above or below, depending on which is the side of the workpiece spindle that is rotated, and radially.

A drawback of these machines regards their operation. Since the driving motor is fixed to the work station, rotation of the workpiece spindle has to be stopped each time the table moves to a new indexing position. Ensuing rotation acceleration and deceleration times negatively affect the overall duration of the working cycle.

From all the foregoing it follows that, although the known rotary transfer machines are efficient to a certain degree, they still have drawbacks.

SUMMARY

The aim of the present disclosure is to overcome the drawbacks set forth above and others still of the known machines.

Within this aim, the present disclosure shortens duration of the work cycle of the rotary transfer machines by saving time for motor and spindle coupling/uncoupling and acceleration/deceleration.

The present disclosure allows a more versatile machining of the workpiece.

Still another advantage of the present disclosure is to reduce the overall number of work stations and machining units needed for the machining of a workpiece, with consequent shortening of the work cycle time to be achieved by a possibility to perform machining from three directions while simultaneously rotate the workpiece.

A further advantage of the present disclosure is to carry out complex machining with standard working units.

Still another advantage of the present disclosure is to enable the use of not only the blanks as workpieces, but also of bars.

This aim and these and other advantages which will become better apparent hereinafter are achieved by providing a rotary indexing transfer machine according to the appended claim 1 and by a method using the rotary indexing transfer machine, according to claim 20.

Further advantageous aspects of the present disclosure are set forth in the dependent claims the subject-matter whereof being part of the present disclosure, either when taken alone or in combination with the subject-matter of other dependent claims.

BRIEF DESCRIPTION OF THE DRAWINGS

Further features and advantages of the disclosure will become better apparent from the description of preferred, but not exclusive, embodiments of a rotary indexing transfer machine and of a method for its use, according to the present disclosure, which are illustrated by way of non-limiting example in the accompanying drawings wherein.

DETAILED DESCRIPTION OF THE DRAWINGS

Figure 1:
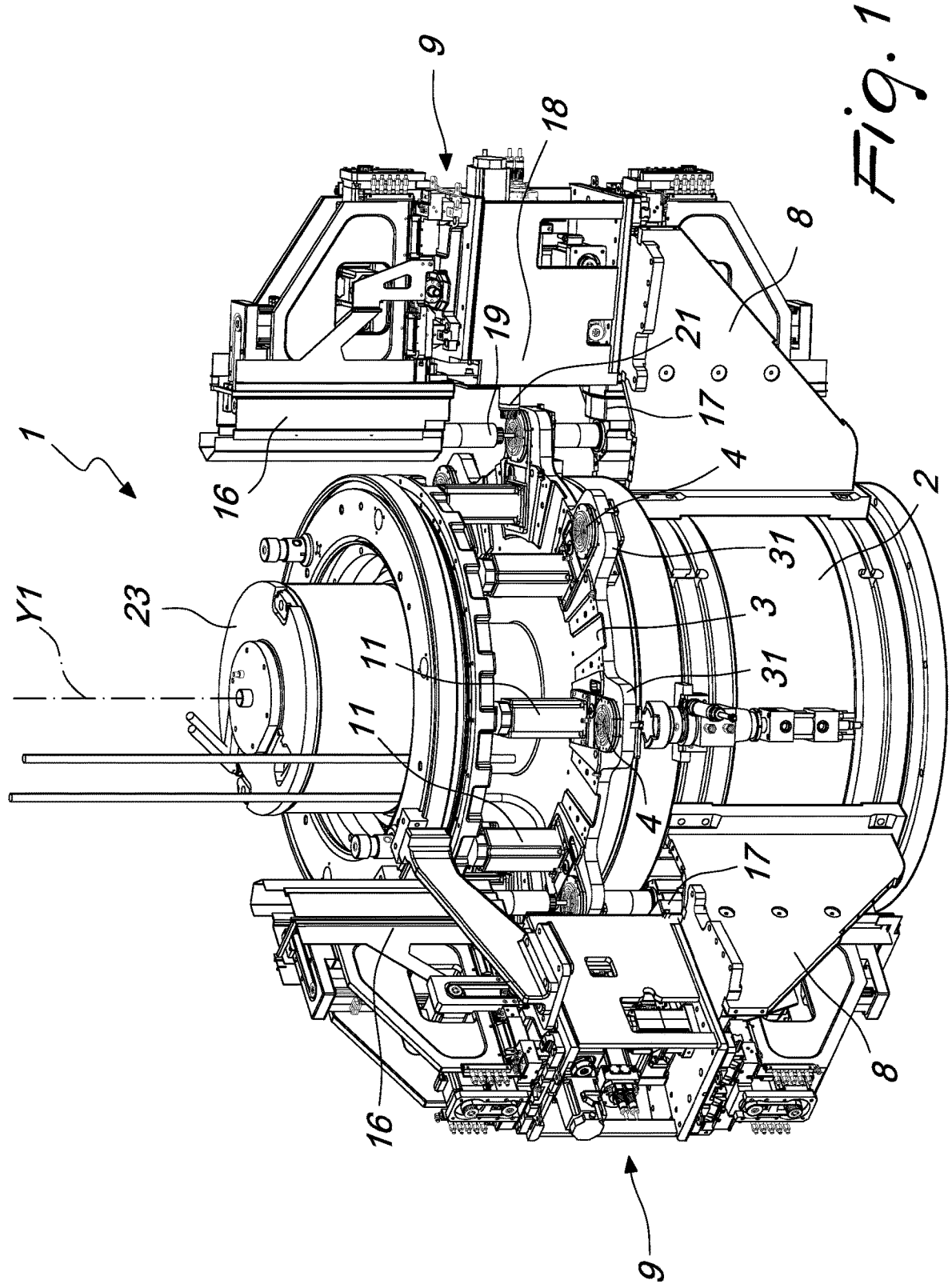
FIG. 1 is a perspective view of a first embodiment of a rotary indexing machine according to the disclosure.
Figure 2:
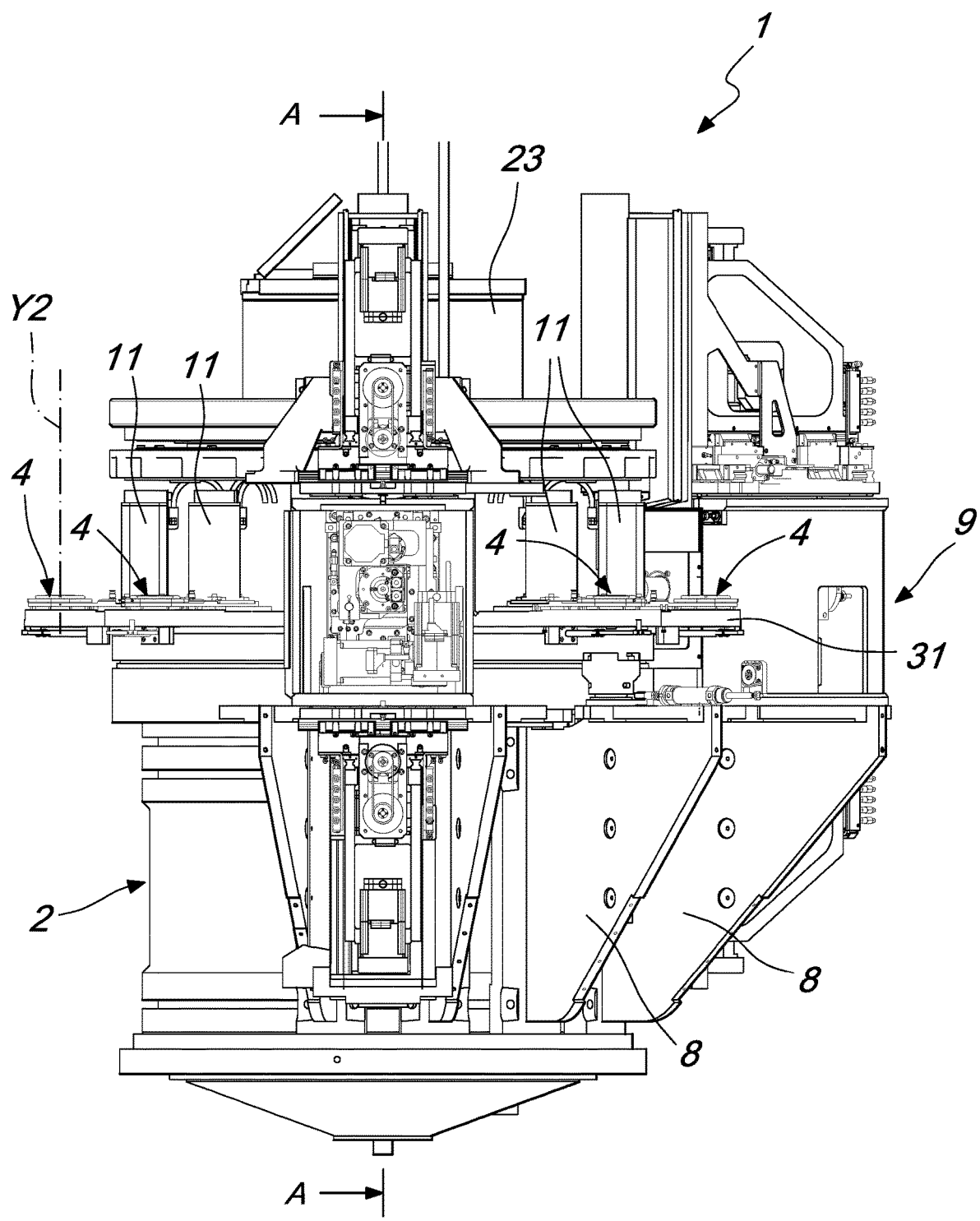
FIG. 2 is a side view of part of the machine of FIG. 1.
Figure 3:
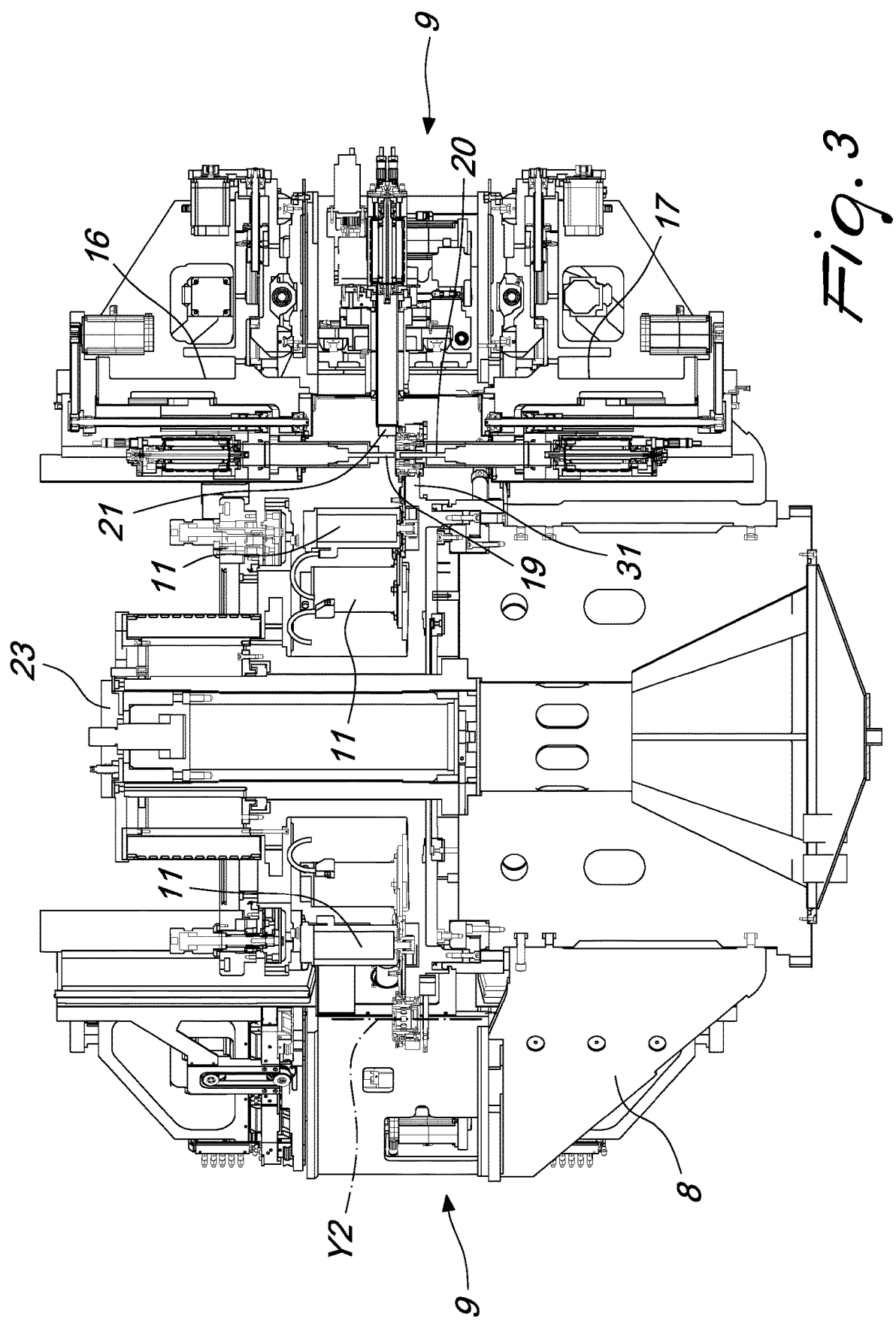
FIG. 3 is a sectional plan view of the machine of FIG. 1, taken along line A-A of FIG. 2.
Figure 4:
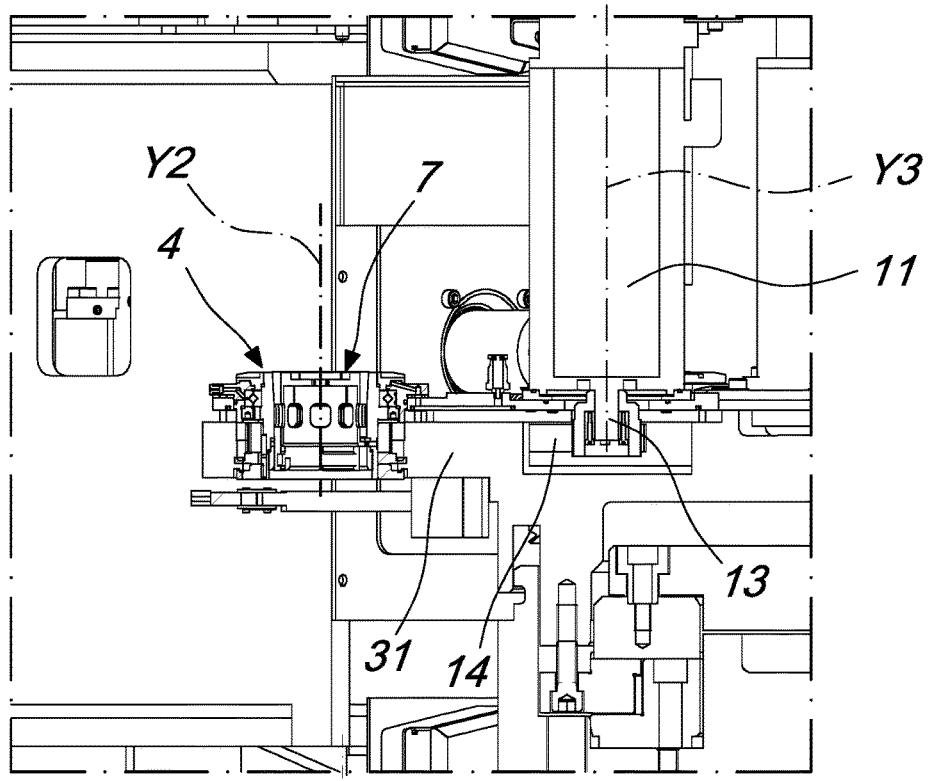
FIGS. 4 and 5 are enlarged detail views of the machine shown in FIG. 3.
Figure 5:
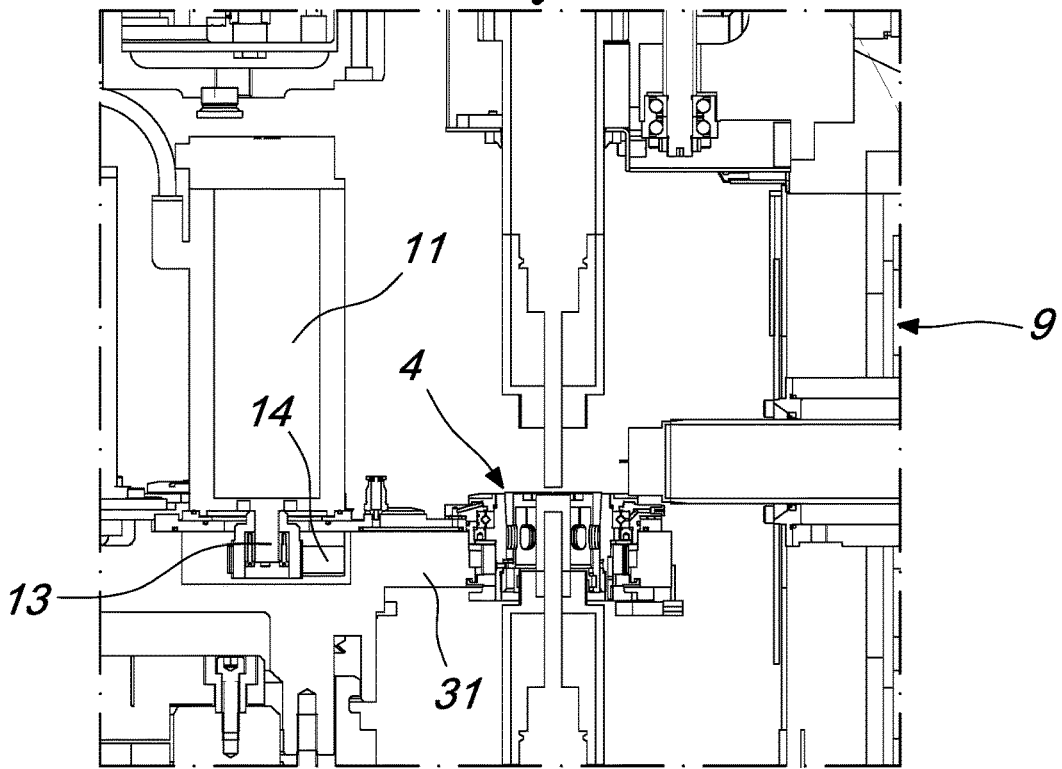

Preferred embodiments of the machine according to the disclosure are disclosed hereinafter, as shown in the FIGS. 1-19, for illustrative purposes only, and will not be intended as limiting the disclosure to such specific embodiments.

The use of the terms "for example", "etc.", and "or" indicates that the features to which such terms refer are to be considered as preferred or possible non-exclusive working examples of the disclosure, unless specified otherwise.

The use of the terms "includes" or "comprises" will be interpreted as "includes/comprises, but not limited to", unless specified otherwise.

Indications such as "vertical" and "horizontal", "upper" and "lower", in the absence of other specifications, will be understood as referring to the arrangement of the various assembly parts or operating conditions as illustrated in the Figures and according to the known meaning they have in the art.

In all of the appended Figures, the same reference numbers are used to indicate, in the different embodiments, the same, corresponding parts.

In the appended drawings, three embodiments of a rotary indexing transfer machine according to the disclosure are shown, respectively designated as 1, 100, and 1000.

The common features of the rotary indexing transfer machine according to the disclosure, in each of the embodiments 1, 100, 1000 disclosed, are at least a machine frame 2 and a rotating table 3. The latter is supported on the machine frame 2, so as to rotate about an indexing axis Y1.

At least one workpiece carrying spindle 4, 104 comprising a hollow shaft for receiving therein a workpiece P and a clamping device 6 for clamping the workpiece P inserted in the hollow shaft are also further provided.

The clamping device 6 comprises a collet 7 that is coupled to the workpiece carrying spindle 4, 104, which, in turn, is mounted on the rotating table 3.

The shaft of the workpiece carrying spindle 4, 104 and the collet 7 are connected for joint rotation about a spindle rotation axis Y2.

The rotary indexing transfer machine 1, 100, 1000, according to the disclosure, further comprises at least one support 8 provided in fixed position next to said rotating table 3, the fixed position setting up a work station.

At least one machining station 9 is further provided having at least one machining unit 16, 17, 18 supported on the support 8 so as to allow machining, at the work station, of the workpiece P clamped in the collet 7.

To rotate the shaft of the workpiece carrying spindle 4, 104 and the collet 7 about the spindle rotation axis Y2, at least one drive motor 11, 111 is provided. The drive motor 11, 111 is advantageously mounted on the rotating table 3 in a position such as to allow machining of the workpiece P, clamped in the collet 7, from two axially opposite machining directions and from a radial machining direction. The mounting position of the drive motor may be selected according to the configuration of the machine 1, 100, 100, to be, with respect to the workpiece carrying spindle 4, 104, for example, sidewise, behind and/or above it.

Indexing is provided in the machine 1, 100, 1000, by way of an indexing device 23 mounted on the machine frame 2. The indexing device comprises indexing means for rotary indexing of the rotating table 3 so as to position the at least one workpiece carrying spindle 4, 104 at a respective work station.

The indexing means can be actuated in an operative indexing arrangement for rotary indexing of the rotating table 3. The indexing means can be further actuated in a non-operative arrangement in which they allow machining of the workpiece P, clamped in the collet 7, from two axially opposite machining directions and from a radial machining direction. Actuation of the indexing means can be made, for example, by an actuation motor of the indexing transfer machine.

Preferably, according to all the embodiments of the disclosure, the indexing axis Y1 is vertical, while the spindle rotation axis Y2 is either vertical, as in the first embodiment of the machine 1, or horizontal, as in the second embodiment of the machine 100.

When more than one workpiece carrying spindle 4, 104 is provided, the respective spindle rotation axis Y2 can be, for all spindles, either vertical, as in the first embodiment of the machine 1, or horizontal, as in the second embodiment of the machine 100. Also, as in a third embodiment of the machine 1000, workpiece carrying spindle(s) 4 having a vertical spindle rotation axis Y2 and workpiece carrying spindle(s) 104 having an horizontal spindle rotation axis Y2 can be provided.

In another embodiment, some or all of the workpiece carrying devices can be fixed, i.e. non-rotatable.

Figure 6:
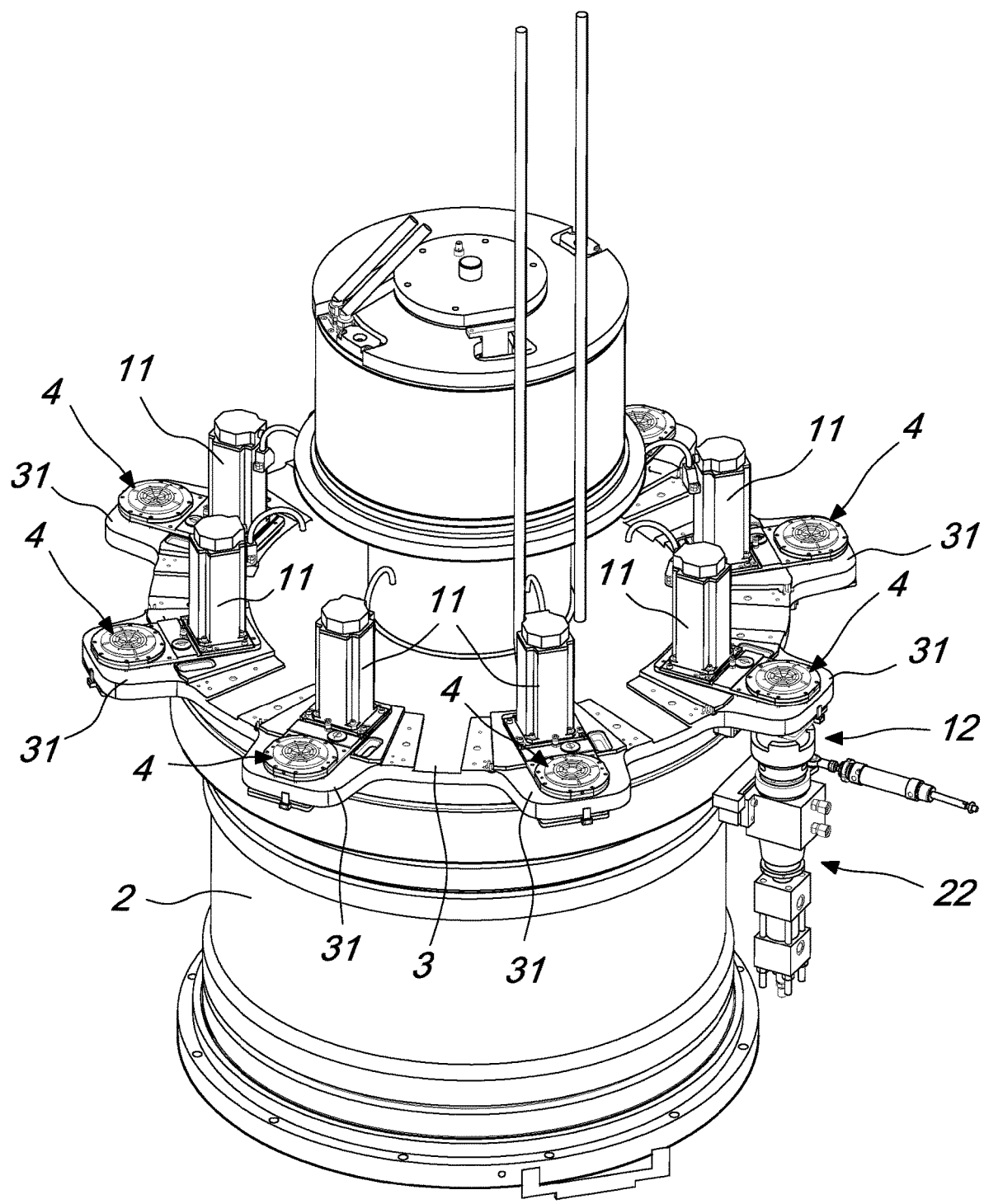
FIG. 6 is a perspective view of a part of the machine of FIG. 1.
Figure 7:
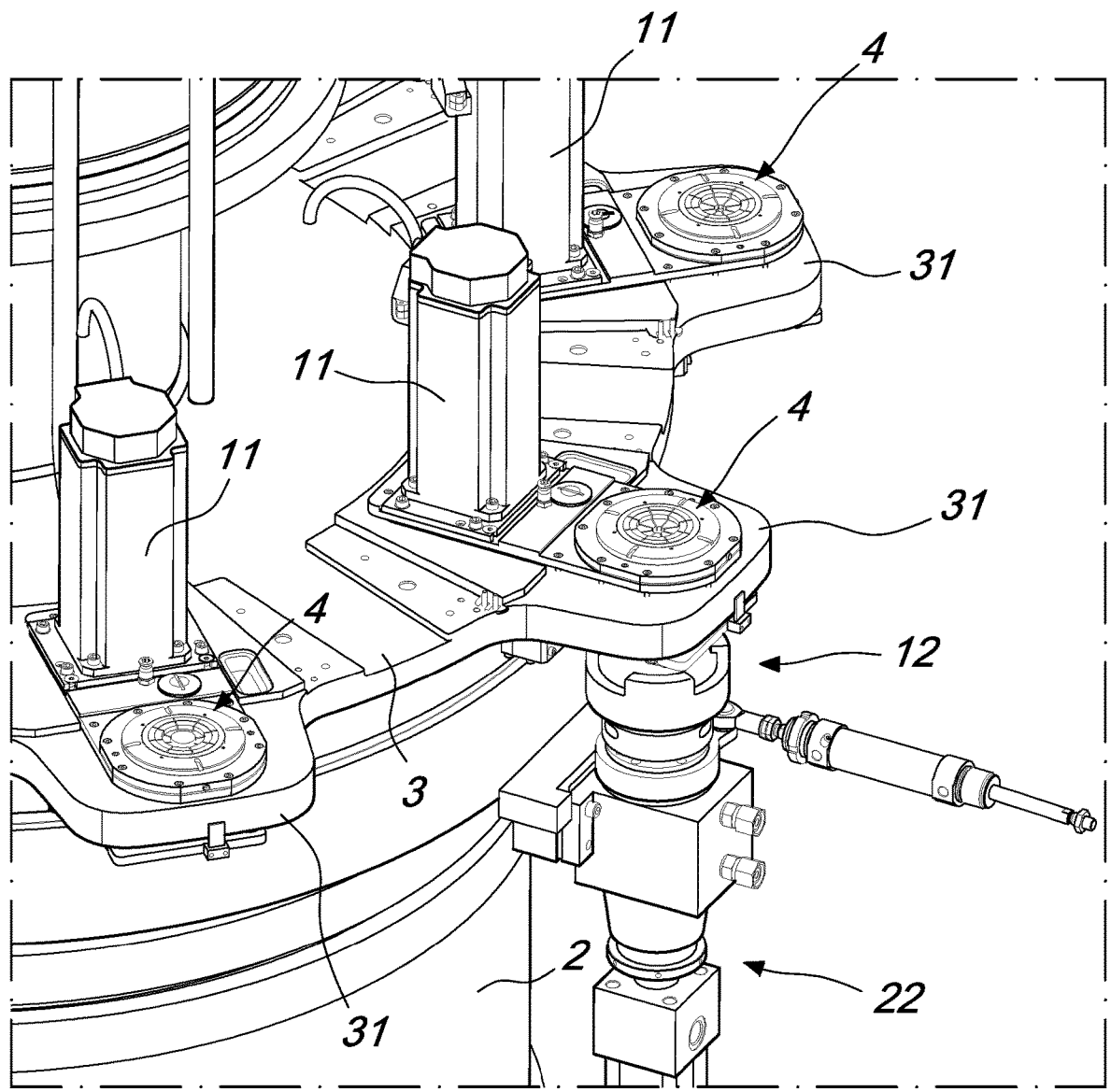
FIG. 7 is an enlarged detail view of the machine part of FIG. 6.
Figure 8:
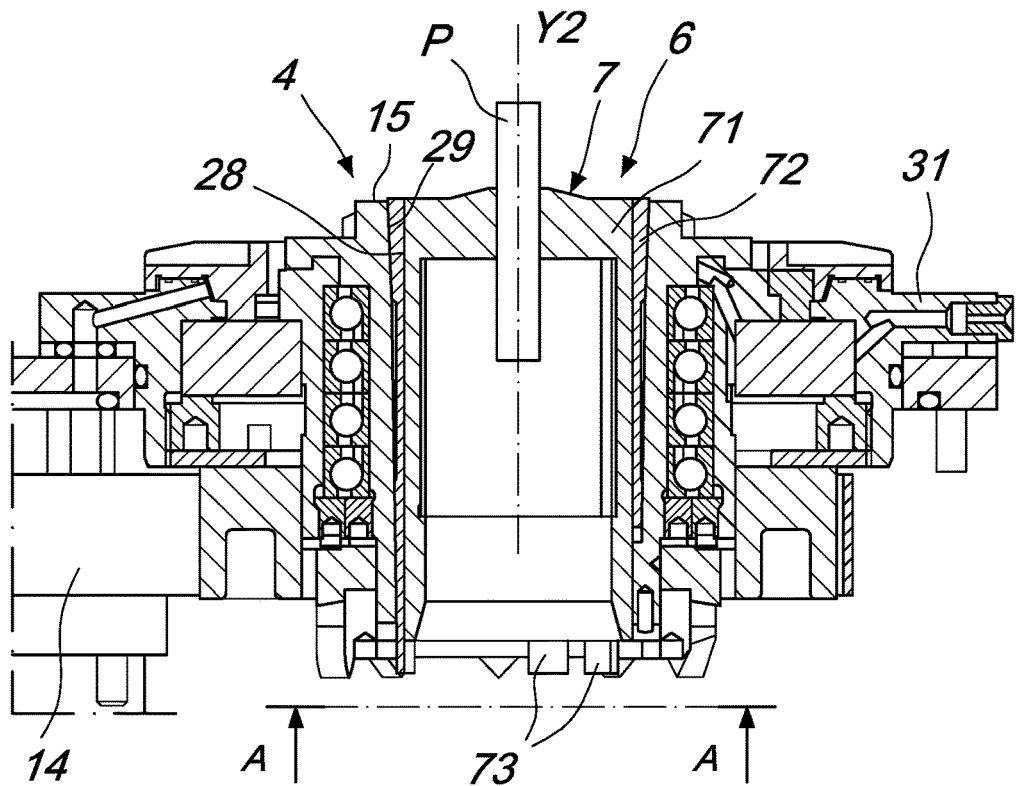
FIG. 8 is a sectional plan view of a spindle assembly of the machine of FIG. 1.
Figure 9:
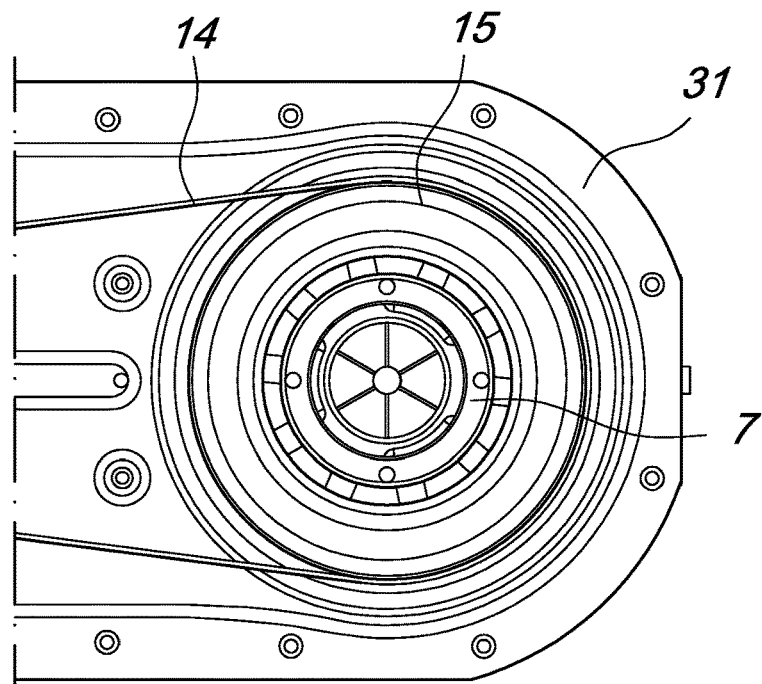
FIG. 9 is a bottom view of the spindle assembly of FIG. 8.
Figure 10:
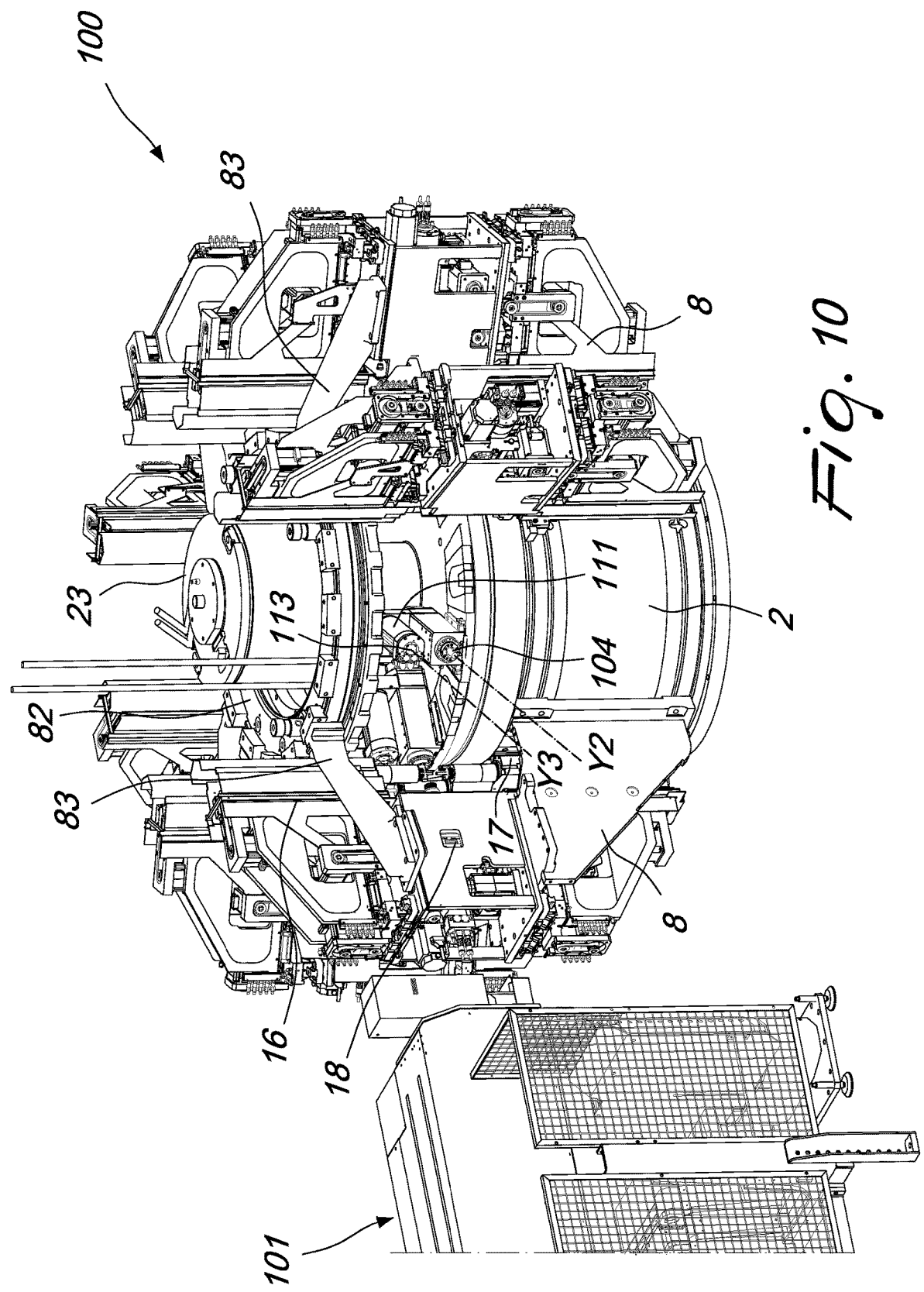
FIG. 10 is a perspective view of a second embodiment of a rotary indexing machine according to the disclosure, shown with part of a loading unit.
Figure 11:
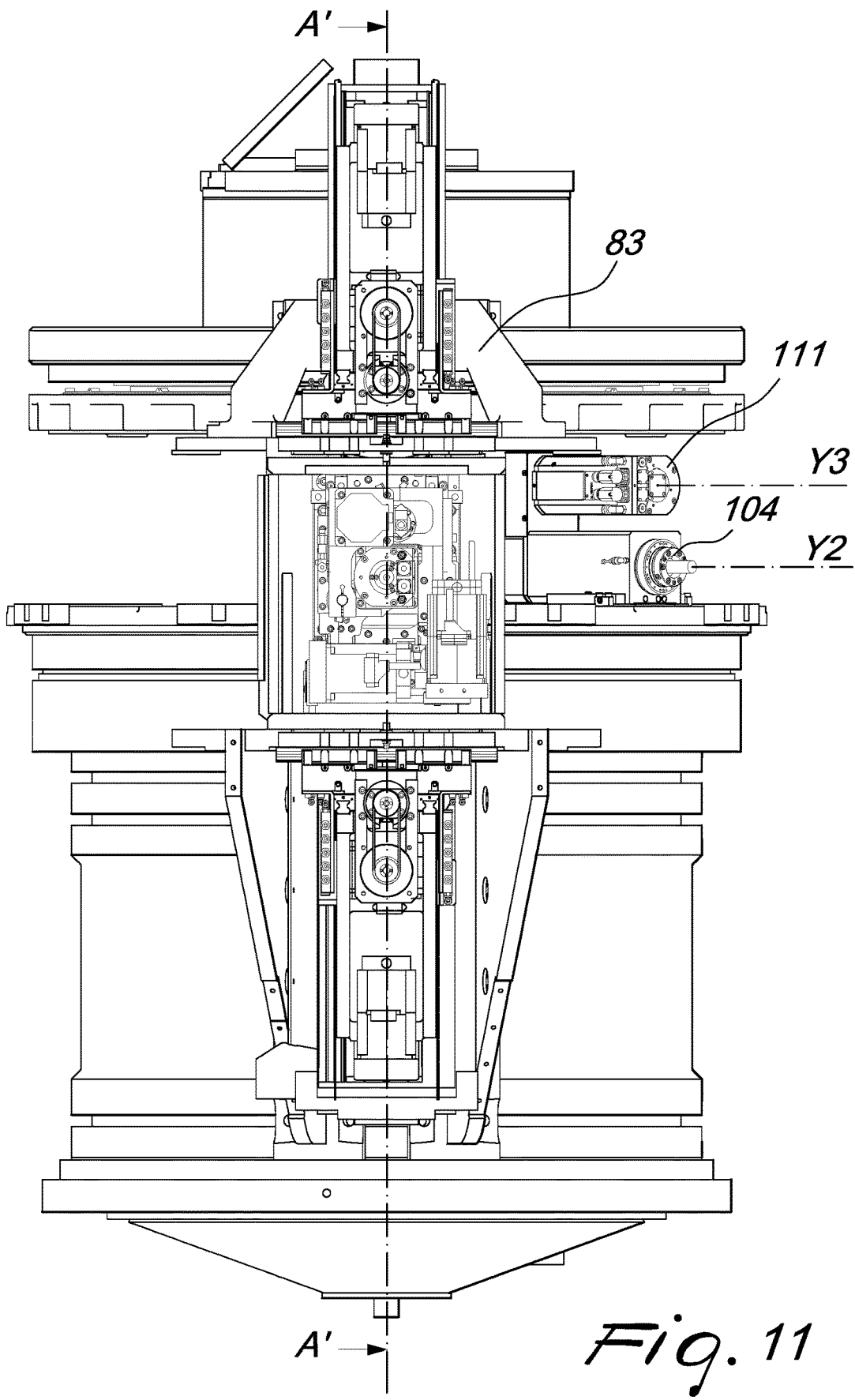
FIG. 11 is a front view of a machining station of the machine of FIG. 10.

The rotary indexing transfer machine 1, 100, 1000, according to the disclosure, can further comprise a clamping actuation device 12, such as spring means and/or hydraulic cylinder, or other suitable, known actuation means, for actuating clamping action of the collet 7 (FIGS. 8, 9). Such a clamping actuation device 12 can be either mounted on the table 3 or provided at a dedicated external (with respect to the table 3) loading/unloading station 22, as shown in FIGS. 6, 7. The loading/unloading station 22 can, preferably but not exclusively, be provided next to the table 3, for example coupled to the frame 2 of the machine.

Preferably, for example when the workpiece carrying spindle(s) 4 is vertical (FIGS. 6, 7), the clamping actuation device is provided at a dedicated loading/unloading station 22 (external with respect to the table 3), while, when the workpiece carrying spindle(s) 104 is horizontal, the clamping actuation device may be comprised in the same spindle (for example, a spring).

Turning now to the drive motor 11, 111 provided in all the embodiments of the rotary indexing transfer machine 1, 100, 1000, in a preferred but not exclusive embodiment it can comprise a rotatable motor shaft 13, 113 that has a shaft rotation axis Y3, substantially parallel to the spindle rotation axis Y2, which is either vertical or horizontal.

Motion transmission means 14, 114 are provided between the motor shaft 13, 113 and the workpiece carrying spindle 4, 104 for transmitting a motor torque from the motor shaft 13, 113 to the workpiece carrying spindle 4, 104.

Suitable motion transmission means 14, 114, for example, may comprise belts and pulleys, which are both precise and silent, or toothed gear transmissions, or other suitable similar/equivalent transmission means.

Referring now to the workpiece carrying spindle 4, an advantageous embodiment thereof is shown in FIGS. 8 and 9.

The workpiece carrying spindle 104, can be provided with spring loaded draw bar for actuating a movable collet.

The workpiece carrying spindle 4, 104 is provided with a collar seat 15 that, preferably, can extend vertically and/or horizontally between opposite sides of the rotating table 3. A through hole is provided in the collar seat 15 for allowing a workpiece P, being clamped by the collet 7, to remain accessible from both opposite sides of the rotating table 3.

This advantageously allows machining at respective regions of the workpiece P from axially opposite machining directions, by way of a machining station 9.

Referring now to FIGS. 8 and 9, a collar seat 15 is shown therein provided with an internal conical portion 28, while the collet 7 comprises an inner collet 71 and an outer collet 72 surrounding the inner collet 71 which is in contact with the workpiece to be held.

The outer collet 72 comprises an external conical portion 29 which cooperates with the internal conical portion 28 once the two elements, collet and collar seat, are axially coupled for determining a radial clamping force to be exerted on the workpiece.

The forced coupling between the collet 7 and collar seat 15 is obtained, preferably by means of fixing rods 73 which are part of the outer collet 72 and protrude from one side of the collar seat 15, allowing so to be axially pulled or pushed to obtain mutual locking or unlocking of the conical portions 28, 29, to clamp or release the workpiece.

When the workpiece spindle 4 is made according to FIGS. 8 and 9, the loading/unloading station 22 is provided at least with operating means for pushing or pulling the fixing rods 73 so to clamp/release the workpiece.

The machining station 9 has the support 8 preferably fixedly mounted on the machine frame 2 itself, as shown in FIGS. 1-3, 10, 14, 15, and 17, so that positioning and indexing are facilitated and the machine has a self-contained structure.

Figure 12:
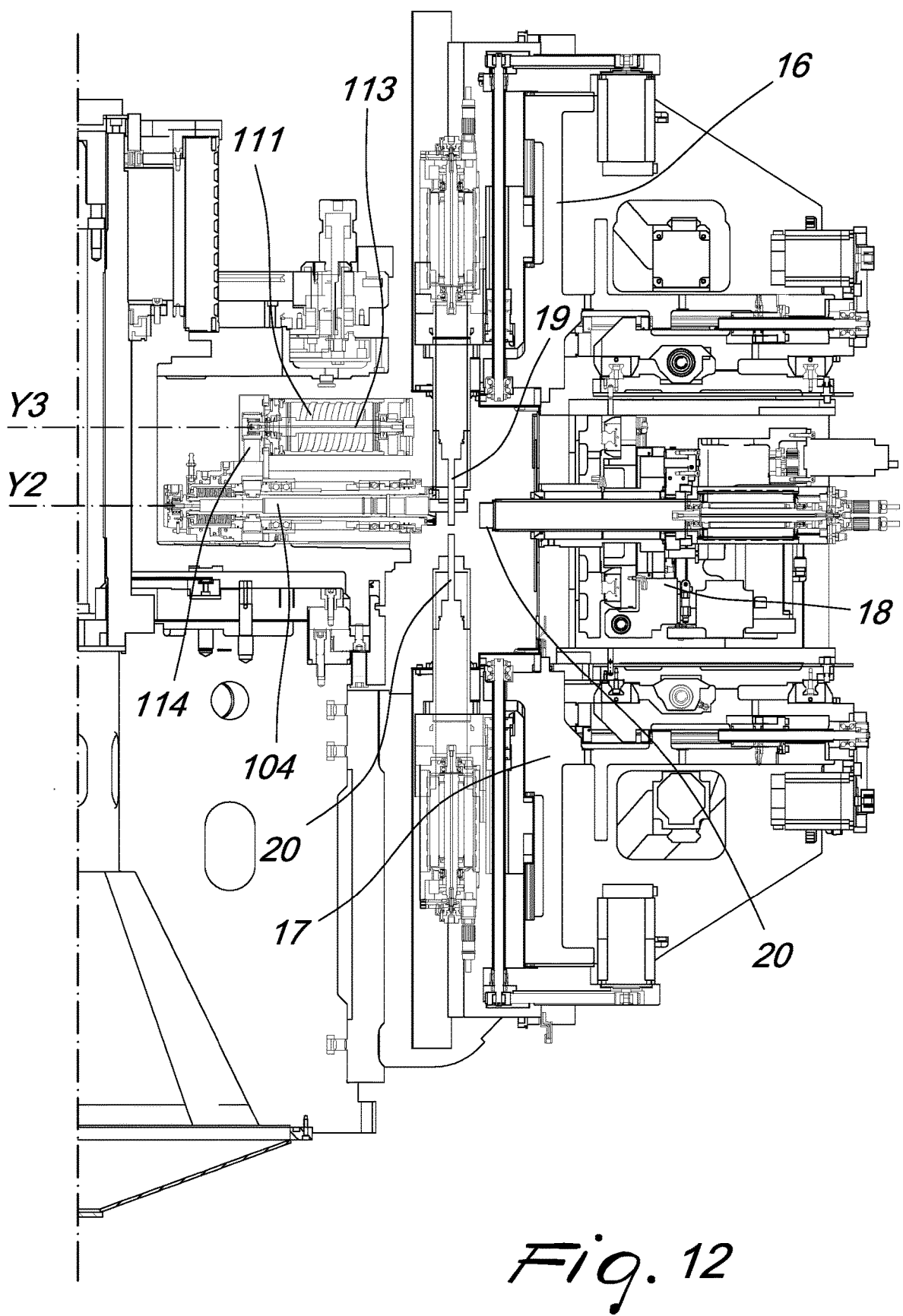
FIG. 12 is a partial cross-sectional side view of a machining station of the machine of FIG. 10.
Figure 13:
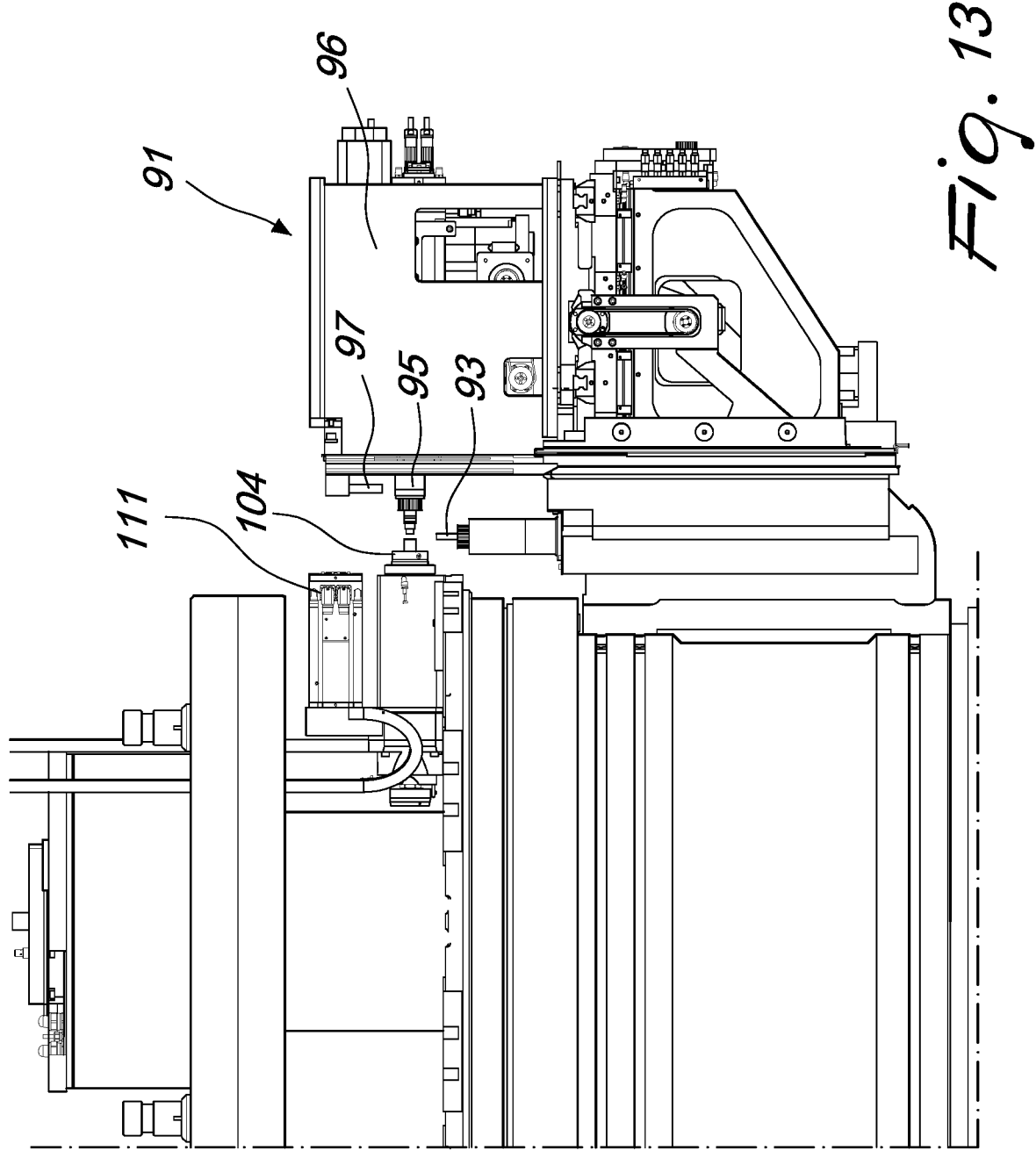
FIG. 13 is a side view of a machining station of the machine of FIG. 10.
Figure 15:
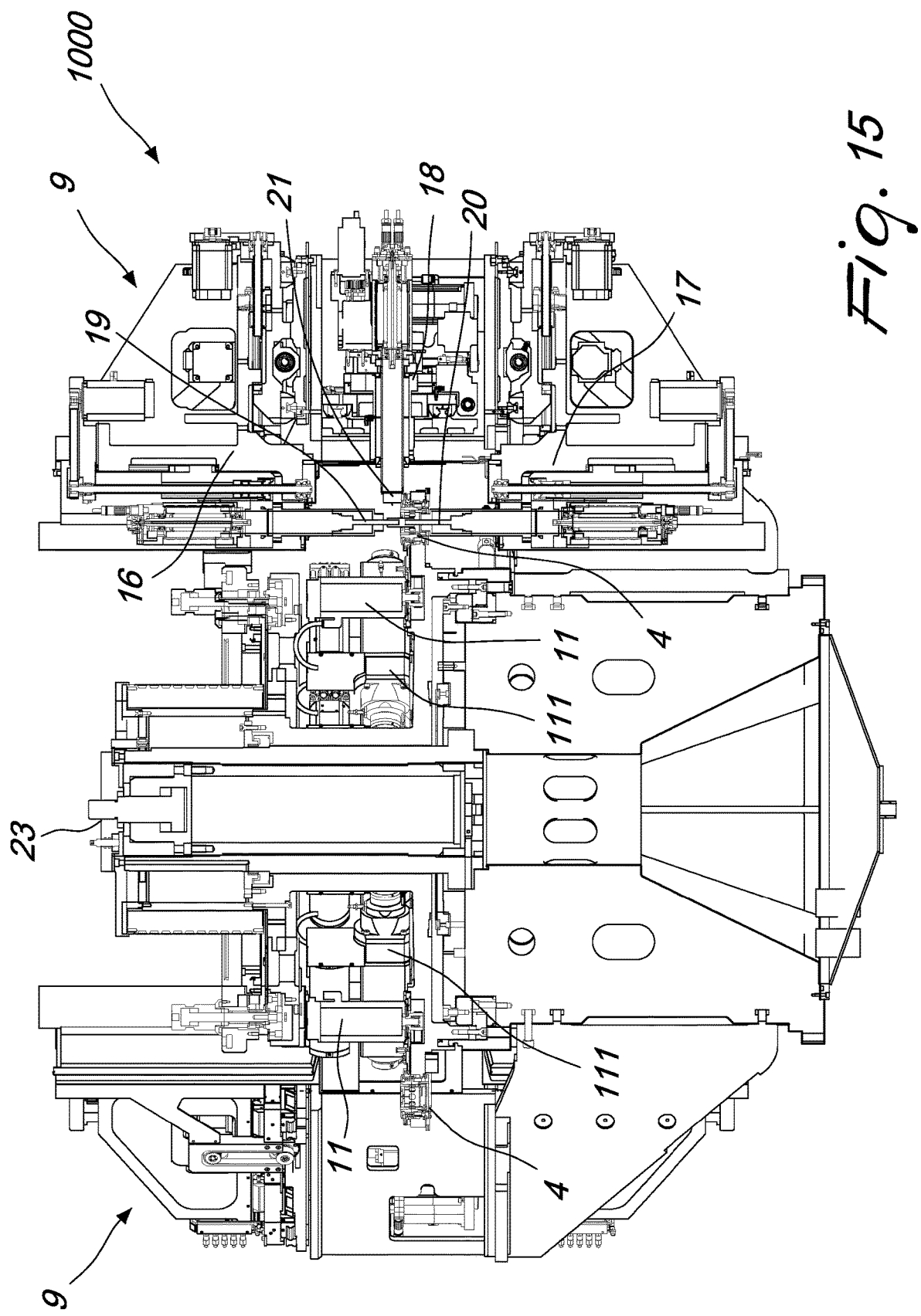
FIG. 15 is a cross-sectional front view of the machine of FIG. 14.

Preferably and not exclusively, the machining station 9 comprises at least first, or first and second, or first and second and third or more machining units 16, 17, 18 (FIGS. 1, 12 and 15). Each machining unit 16, 17, 18 is provided at least with a respective tool spindle 19, 20, 21 for holding at least a respective tool.

Nevertheless, fewer machining units can be provided, if this is required for specific machines.

Tool spindles 19, 20 of the first and second machining units 16, 17 are located at opposite sides of said rotating table 3 to substantially face each other whereby to allow machining of the workpiece P from opposite machining directions substantially parallel or, when necessary, perpendicular to the spindle rotation axis Y2.

For example, as in the attached Figures, there are provided a first machining unit 16, substantially above the workpiece carrying spindle 4, 104, and a second machining unit 17, substantially below the workpiece carrying spindle 4, 104. This allows machining of the workpiece from the top and from the bottom, at each station 9.

The tool spindle 21 of the third machining unit 18 is arranged radial with respect to the spindle rotation axis Y2, so to provide a third machining direction of the workpiece at each station 9.

Preferably, one or more machining units 16, 17, 18 can be a CNC, a mechanically or an hydraulically driven unit. Preferably still, the one or more machining units 16, 17, 18 can have one to four machining axes.

The table 3, supporting the workpiece, can, in general, be rotated and continuously positioned by a CNC driven motor with or without gear transmission or by a torque motor. The indexing steps may be discrete, by using indexing means, or continuous, by using a brake system or by the table being held in position only by the motor torque. Therefore during machine operation the table is rotated and indexed step by step, so as to move said workpiece through different operating stations 9, surrounding the rotating table 3 itself.

In order to allow a more versatile machining, at least one among the first, second and third tool spindles 19, 20, 21, and preferably each one, can be provided so as to be arrangeable in a tilted position for machining the workpiece P along a machining direction that is inclined with respect to said second axis Y2.

The spindle tilted position can be provided either by tilting one or more of the tool spindles 19, 20, 21, or by tilting the entire machining unit 16, 17, 18.

As shown in the attached Figures, a plurality of workpiece carrying spindles 4, 104, a plurality of drive motors 11, 111, a plurality of station supports 8, and a plurality of machining stations 9, all as described above, are provided. Each of the drive motors 11, 111 is supported on the rotating table 3.

In all of the embodiments 1, 100, 1000, the rotary indexing transfer machine preferably comprises a rotary indexing device 23 that may be mounted on a top face of the machine frame 2 so as to be rotatable about the indexing axis Y1 (FIGS. 1-3, 10, 14, 15 and 17).

In accordance with the disclosure, the rotary indexing device 23 is designed for indexation of the rotating table 3 for precise positioning of the workpiece carrying spindles 4, 104 at the respective work stations for machining of the workpieces P clamped in the respective collets 7.

The indexing device 23, and also the drive motor 11, 111 are mounted, as disclosed, and so that they do not interfere, in their idle state or in operation, with the machining of a workpiece P, which is clamped in a collet 7, from two axially opposite machining directions and from a radial machining direction.

Figure 18:
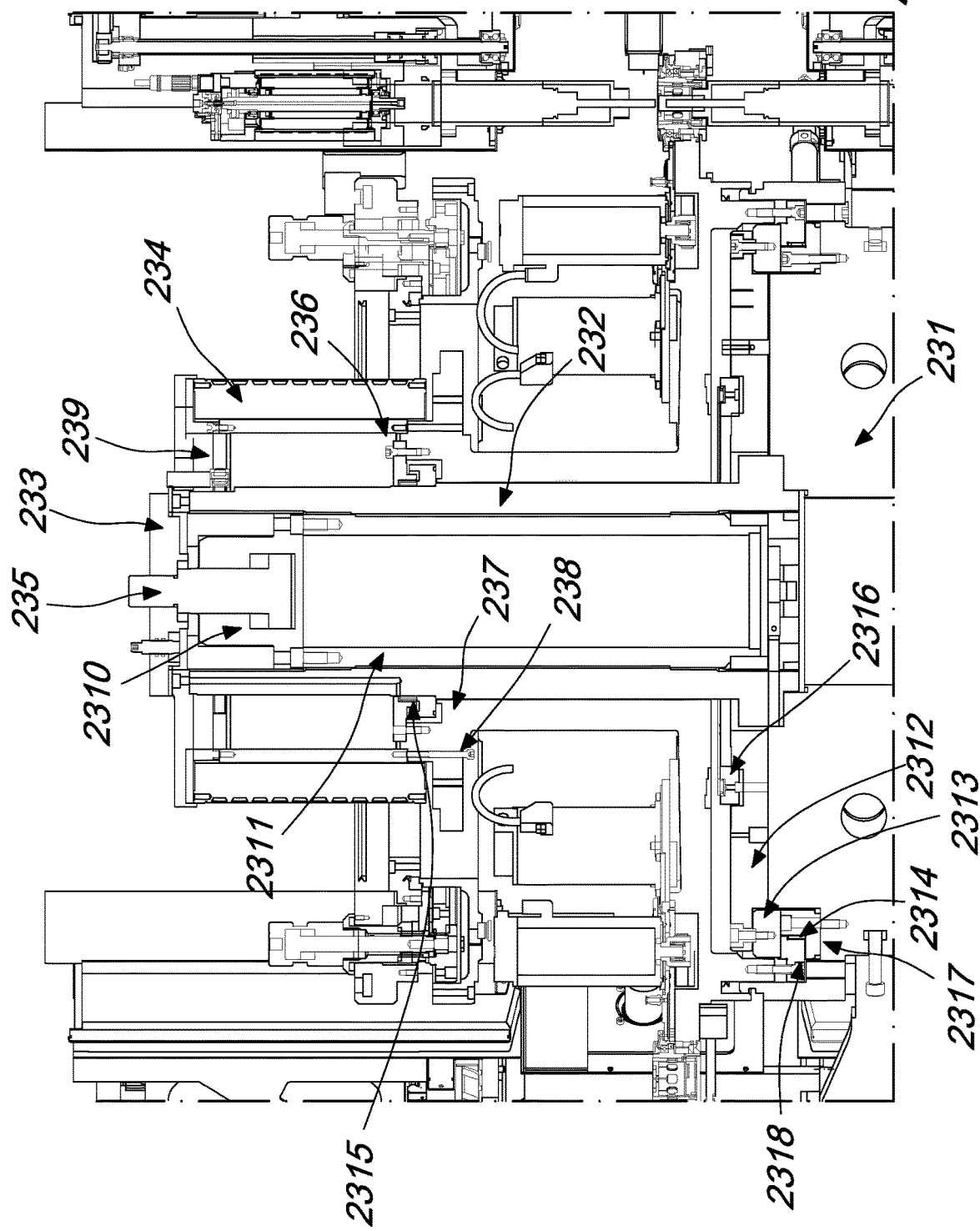
FIG. 18 is a partial cross-sectional view of a detail of the machine as shown in FIG. 17.

Although various types of indexing devices are known in the art and can be used in the machine 1, 100, 1000 of the present disclosure, in the following an example of a preferred, non-exclusive embodiment of a table positioning and indexing device will be described with reference to FIG. 18.

The main task of the positioning and indexing device is fast pre-positioning of the table by way of a motor/gear motor followed by a precise positioning achieving the final table positioning as well as its stiff clamping.

Precise table position and clamping stiffness are indispensable to machine workpieces fixed on the table by way of workpiece clamping devices.

In the embodiment here described the positioning and indexing device 23 comprises a column 232, which is fixed to a main machine support 231, and the indexing means.

The indexing means may comprise, in an exemplary, non-exclusive embodiment, a flange 2312 to which a floating Hirth ring 2313 is attached for cooperation with a rotating Hirth ring 2318 coupled to the rotating table 3 and with a fixed Hirth ring 2317 connected to the main machine support 231. The flange 2312 is actuatable for vertical movement to provide engagement or disengagement of the floating Hirth ring 2313 with, or from the rotating 2318 and fixed 2317 Hirth rings.

More in particular, a flange 233 is provided that is attached to the column 232 and therefore also fixed.

A stator 234 of a torque motor and the rod 235 of, for example, a hydraulic piston are attached to the flange 233 and therefore also fixed.

The rotor of the torque motor is attached to the indexing table 237 by way of screws 238.

Therefore, rotation of the motor enables the positioning of the indexing table 237.

An angle measurement system 239 enables a reading of the indexing table position and is also used as positioning feedback by a motor control. The stiffness of the torque motor and of mounting bearings 2314, 2315 e 2316, described hereinafter, would not be enough to allow machining of the parts clamped on the table 3, therefore a table indexing has to be performed.

For performing the indexing action, the indexing device may comprise, for example, a triple Hirth crown as described hereinafter.

Other suitable systems may also be used with proper arrangement, such as indexing bolts, indexing wedge or others.

A piston housing 2310 moves vertically when the piston is actuated because of the fixed rod 235. The housing 2310 is attached to a tube 2311 which is jointly connected to a flange 2312.

The flange 2312 has holes through which the column 232 is attached to the main machine support 231.

To the lower face of flange 2312, the floating Hirth ring 2313 is attached.

The ring 2313 must have six degree of freedom in order to avoid any deformation of the other two Hirth rings during the clamping process.

The indexing table 237 is guided radially, by the bearings 2314 and 2315. Both bearings must have small radial clearance in order to allow small planar movements during the indexation.

The indexing table has also the vertical bearing 2316 which allows the rotation of the table when this is lifted by the tube 2311 and the flange 2312 which are mutually connected, for example are welded or screwed together.

To a lower side of the indexing table the rotating Hirth ring 2318 is attached, while to the main machine support 231 it is attached the fixed Hirth ring 2317.

Before rotation of the indexing table the piston lifts the connected flange 2312 and, therefore, the floating Hirth ring 2313 is disengaged from the other two rings, and the bearing 2316 lifts the indexing table.

The motor and the measurement system 239 allow the positioning of the indexing table in the desired position.

After having achieved the position, the piston pushes the cylinder 2311 and the flange 2312 downward.

The floating Hirth ring 2313 is therefore pushed down, and all its teeth fit exactly and simultaneously with the teeth of the fixed 2317 and rotating 2318 Hirth rings.

The Hirth rings have a high number of teeth symmetrically placed on the crown circumference. Their alignment ensures a fine, precise planar positioning of the crown center and a precise angular positioning of the rotating Ring 2318 related to the fixed ring 2317. The fixed Hirth ring 2317 has a radial protrusion against which the rotating ring 2318 is pushed.

So, in clamped configuration the piston clamping force clamps together the rotating Hirth ring 2318 between the floating Hirth ring 2313 and the fixed Hirth ring 2317. In this manner the axial stiffness as well as the angular stiffness of the indexing table may be really high.

The structure and operation of the indexing device, hereinabove described, is suitable to avoid any interference with the working area in which the workpiece is machined by the machining units, acting preferably along three working direction.

In particular, the indexing device 23 is arranged along the central part of the machine, radially internally with respect to, and under the area where the machining of the workpiece P, clamped in the collet 7 is performed.

According to another optional feature common for all of the three preferred embodiments of the machine 1, 100, 1000 of the disclosure, herein disclosed, station supports 8 are fixed on the cylindrical frame 2 by a plurality of fixation means 81.

Figure 19:
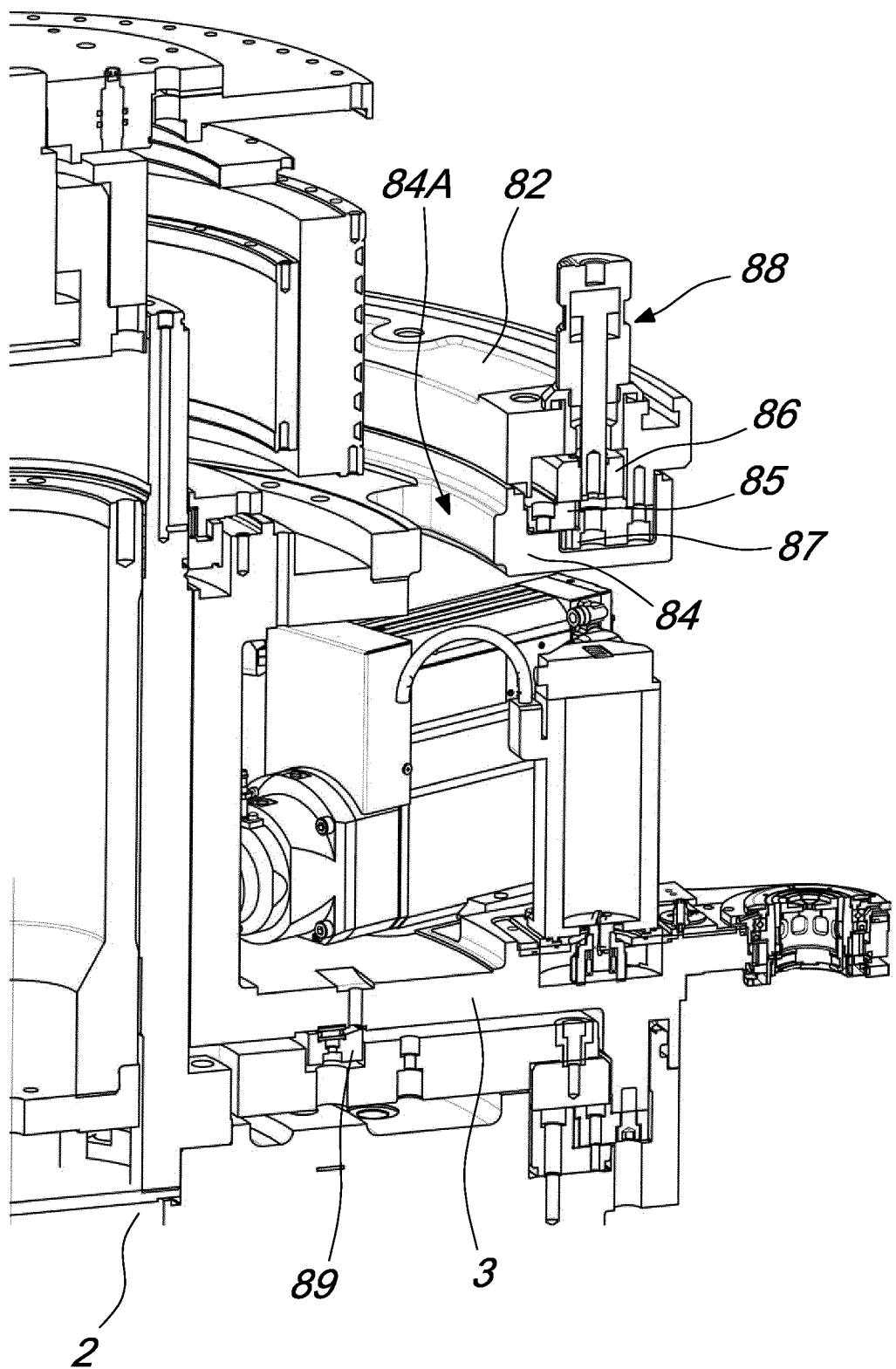
FIG. 19 shows a unit stabilization device for the machine according to the disclosure.

Reference is made to FIG. 19, which shows features of the machine 1 according to the second embodiment. Same such features can be provided also in the machine according to the embodiments 1 or 1000.

FIG. 19 shows a unit stabilization device optionally provided on the machine according to the disclosure.

Fixation means 81 (see FIG. 17) are provided that fixedly couple the station supports 8, that support machining station 9, to the frame 2.

In order to improve structure stiffness and to avoid machine distortions due to stress, such as thermal, inertial or vibration stresses, a fixation ring 82 is provided, substantially parallel to the table 3 and above the latter.

The fixation ring 82 is preferably fixed to the machine frame 2 to prevent any possible offset of its center.

Stations 9 are further provided with additional supports 83 that are fixed to the ring 82.

When drive motors 11, 111 are provided on the table 3, in operation they turn jointly with the latter. Consequently, control, data and/or electrical power cables, connected to the drive motors 11, 111, have to pass inside the ring 82.

Therefore, in this situation, it is not possible to connect directly this ring 82 with the column 30, which is part of or, fixed to the frame 2.

In order to provide safe cable connection to the motor, a disk 84 with through holes 84A, suitable for allowing passage therethrough of the motor cables, is fixed to the table 3.

Furthermore, a first Hirth ring 85 of the stabilization device is attached to the disk 84.

The table 3, the disk 84 and the first Hirth ring 85 are connected and rotate with the table 3.

A second Hirth ring 87 of the stabilization device is connected to the ring 82 which is connected by supports 83 to the stations 9.

On the ring 82 a plurality of clamping means, for example hydraulic pistons 88, are provided, adapted to clamp a third Hirth ring 86 to the other two Hirth rings 85 and 87 as soon as the table has reached the desired position and a table Hirth ring set 89 has been locked.

In this manner, a chain of fixed and rigid connections between the cylindrical frame, the table and the machining units is provided.

With particular reference to the first embodiment of the machine according to the disclosure, the, or each drive motor 11, is mounted on the rotating table 3 with the rotatable motor shaft 13 having the shaft rotation axis Y3 vertical and parallel both to said indexing Y1 and spindle rotation axis Y2.

In a preferred embodiment, the rotating table 3 is substantially circular and is provided with radial shelves 31 (FIGS. 14 and 16) protruding radially from the central circular portion of the table 3. The table 3 is coupled to the frame 2 that is substantially cylindrical.

Preferably, in order to allow an easier machining of the workpiece during operation, and to enable a better chip evacuation, at each radial shelf 31, a respective spindle 4 is provided, mounted so that the respective spindle 4 protrudes from the central circular portion of the table 3.

This can be achieved by displacing the respective spindle 4 toward a corresponding station 9.

The workpiece carrying spindles 4 are provided angularly equally spaced on the table 3, at the same angle one to another (for example, when eight spindles 4 are provided, they are at 45 degrees one to another).

As regards the embodiment 1, but also the other embodiments herein disclosed, it will be noted that the workpiece rotation does not need to be stopped from one station to the next one, thus saving work cycle time.

Furthermore, a workpiece can be machined simultaneously from three directions in every station, also where the workpiece requires rotation or angular positioning. Thanks to this opportunity, the same part can be machined in fewer stations compared to production lines known in the art.

Workpieces can be rotated during machining operations, meeting high concentricity requirements and without missing machining units.

Furthermore, the time necessary for motor and workpiece spindle coupling/uncoupling is saved with respect to the known machines having different motor arrangements.

Reference is made now to FIGS. 10-13 to describe the rotary indexing transfer machine 100 according to a second embodiment of the disclosure.

The main difference between the machine 1 (FIG. 1) and the machine 100 (FIG. 10) lies in the fact that the workpiece carrying spindles 104 of the latter are mounted horizontally on the rotating table 3, along radial directions thereof, the respective spindle rotation axes Y2 thereof being perpendicular with respect to the indexing axis Y1.

Accordingly, the, or each, drive motor 111 is mounted on the rotating table 3 with the rotatable motor shaft 113 having the shaft rotation axis Y3 horizontal and parallel to the spindle rotation axis Y2, as better shown in FIG. 12.

The machine 100 is so a transfer machine able to work directly on a preferably short bar. The short bar protrudes from the spindle by only an extent suitable for the specific necessary machining without unwanted vibrations, as it occurs in a multi-spindle lathe.

The motor 111 can be, for example, a CNC motor.

Preferably, for fixing in position the spindle shaft (and, therefore, the workpiece) when this is needed during machining, for example during machining of axial slots on the workpiece surface, an external locking device is provided for mechanically locking the spindle 104. This allows reaching higher positioning repeatability and stiffness.

The machine 100 can be provided with an external bar loader 101. In operation, a bar, three or four meters long, is horizontally introduced into the spindle 104 and clamped therein.

The bar is then cut to obtain a workpiece (in form of a short bar), that remains clamped by the corresponding spindle 104. Thus, the reduced length of the workpiece with respect to the original bar allows higher rotation speed without unwanted vibrations.

Short bars, provided for machining, can also be precut on devices outside the machine.

Turning of a bar generally allows complete machining of the outside profile and of one face of the workpiece.

Preferably, a cutting station 91 is provided on the machine 100. The cutting station 91 (FIG. 13) is provided, in fixed position with respect to the table 3, being it mounted on the frame 2 by way of supports 8.

The cutting station 91 comprises a cutting tool 93 having at least an axial positioning axis and a radial machining axis.

At the end of the machining cycle the workpiece is cut from the bar by a cutting tool 93. A further workpiece spindle 95 is provided, that, in operation, turns synchronously with the workpiece carrying spindle 104 and clamps the workpiece/pre-machined bar end.

The workpiece spindle 95 holds one end of the workpiece during and after the cutting phase, performed by the cutting tool 93.

Preferably, the workpiece spindle 95 is held by a three axes CNC driven unit 96 and enables the machining of the workpiece face that is generated by the cutting operation and, thus, not accessible for machining.

Rotating or fixed additional tools 97 may preferably be provided on the cutting station 91, for example for turning or milling/drilling operations performed on the workpiece held by the additional workpiece spindle 95.

The tools 97 may be preferably fixed on the cutting station 91 using a standardized tool interface.

To start a new cycle, the workpiece in the form of a short bar, can be pulled out from the front nose of the spindle by an external unit, additionally provided, and extracted for a required length.

As soon as the short bar is completely machined, the remaining part of the short bar has to be removed from the spindle, pulling it out from the front nose using, for example, the same external unit used to position the short bar in machining position. As soon as the workpiece spindle is empty, a new bar may be fed into the spindle.

In this way, workpieces can be machined from a short bar turning in the spindle. The short bar is one generated starting from bars of standard length. No additional position changing operations are required, and only little scrap material remains, such as that constituted by the end region of the short bar or the end region of the long bar.

Turning machining operations, as well as drilling in defined angular positions and milling operations can be also performed.

In case of radial drilling operations, it is possible to machine the workpieces in each station using two independent, radial working units.

At the same time a third axial working unit can machine the workpiece.

Thanks to the possibility to use standard, long bars, pre-machining operations and related costs are reduced.

Machining of workpieces in form of short bars clamped in the spindle, greatly reduce vibrations and, therefore, higher RPM than in multi-spindle lathes can be reached.

The collet rotation doesn't have to be stopped from one station to the next one.

The machine according to the disclosure is more dynamic in operation than a multiple spindle lathe, due to short bar use in the spindle (less inertia).

Figure 14:
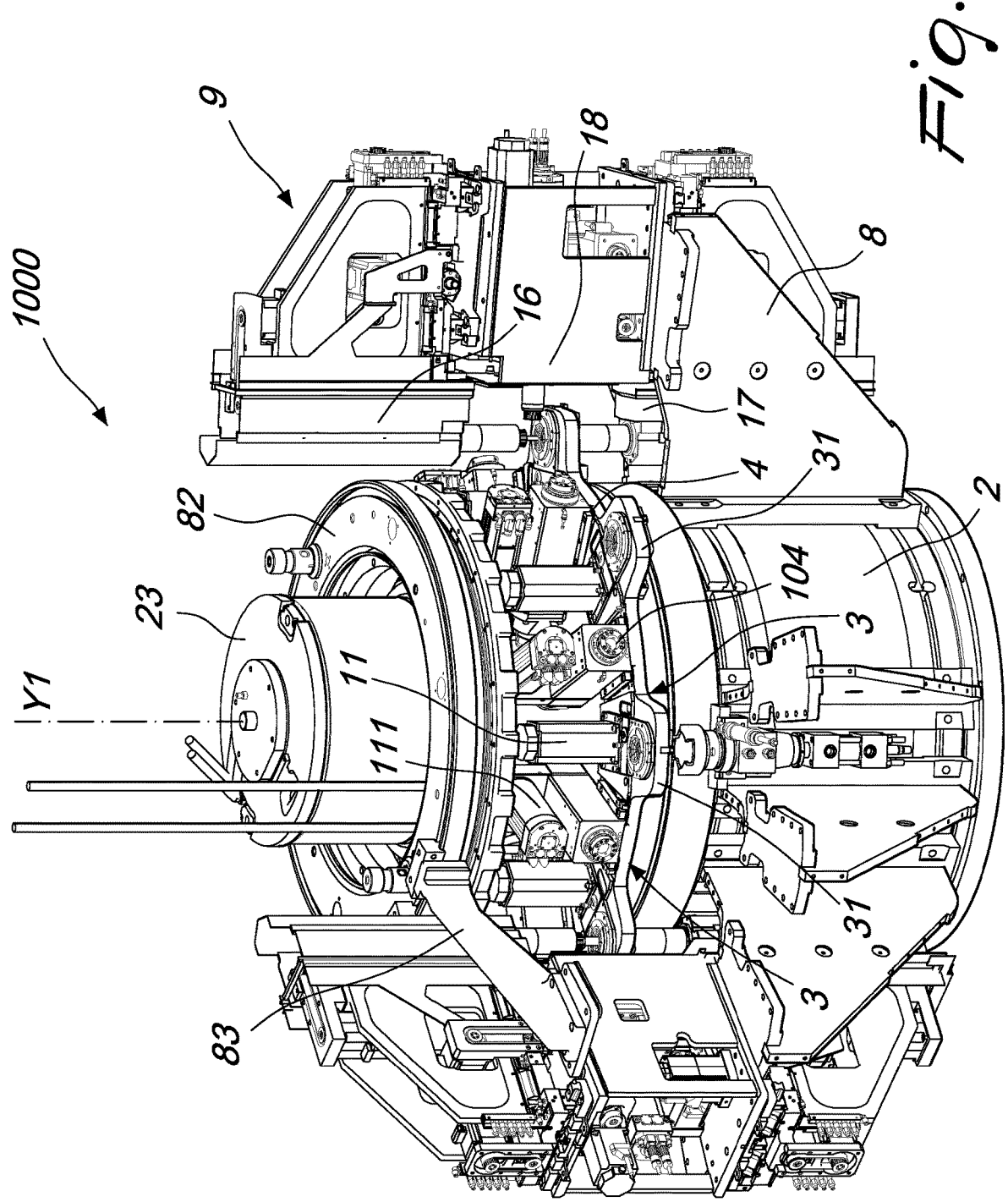
FIG. 14 is a perspective view of a third embodiment of a rotary indexing machine according to the disclosure.
Figure 16:
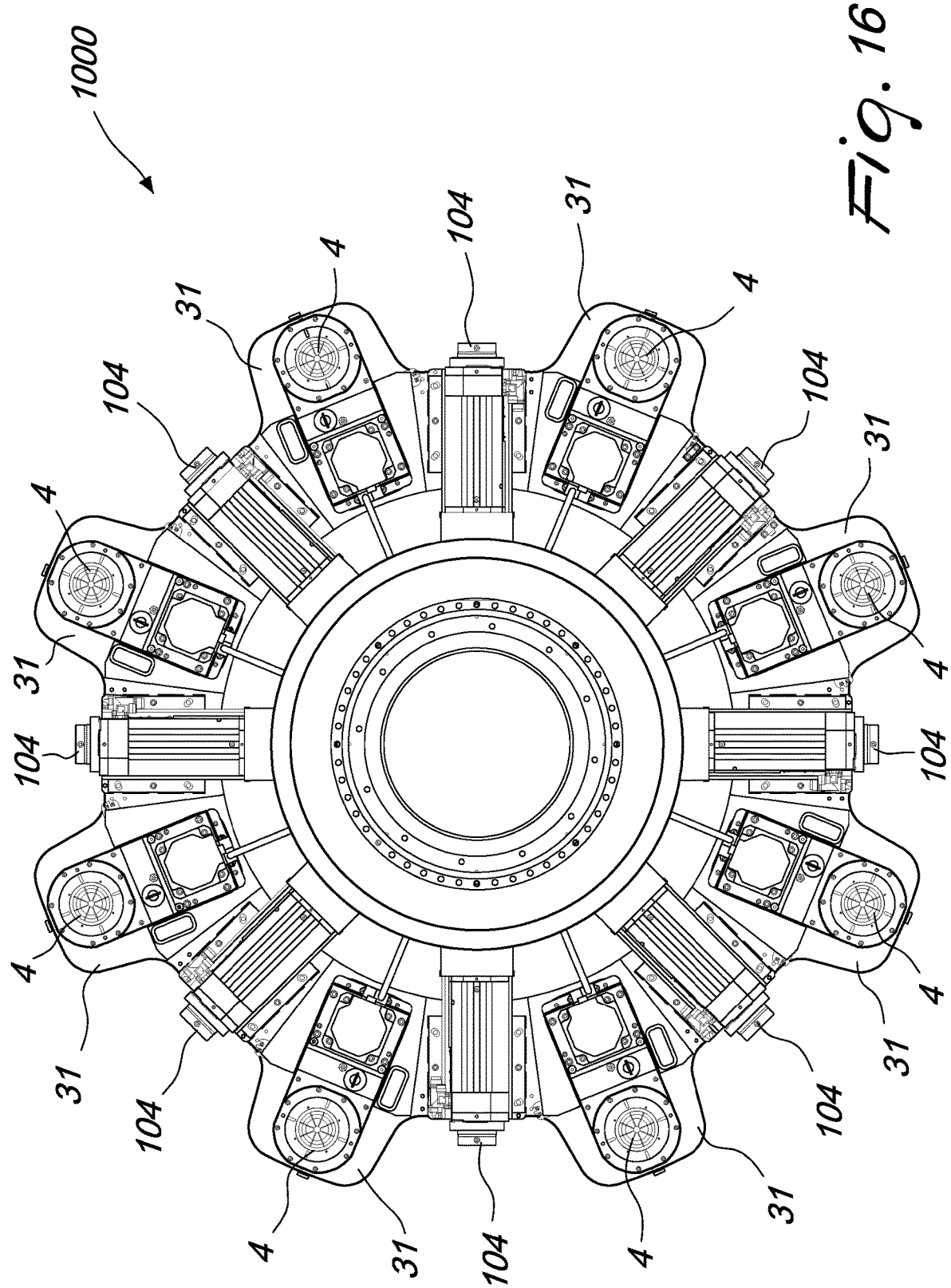
FIG. 16 is a top plan view of the rotating table of the machine of FIG. 14.
Figure 17:
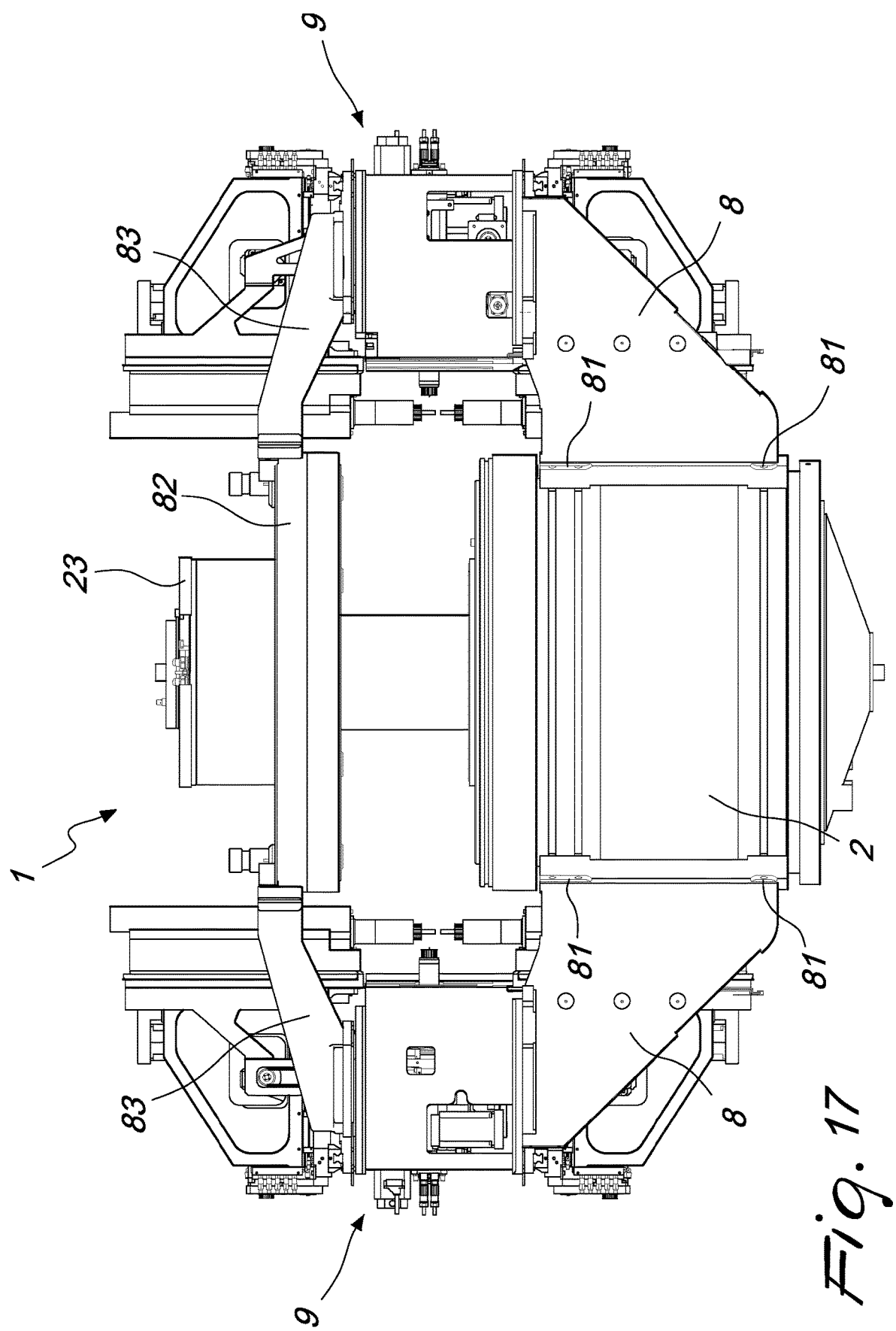
FIG. 17 is a side view of a machine showing structure features common to all of the embodiments of the rotary indexing machine according to the disclosure.

With reference now to the third embodiment of the machine 1000 of the disclosure as illustrated in FIGS. 14-16, the rotary indexing transfer machine 1000 comprises, mounted on said rotating table 3, at least one vertical and one horizontal workpiece carrying spindle 4 and 104. The vertical and horizontal workpiece carrying spindles 4, 104 are rotatable about spindle rotation axes Y2, X2 thereof that are, respectively, vertical and horizontal.

Preferably, in the case that more than one vertical workpiece spindle 4 and more than one horizontal workpiece spindle 104 are provided, as in the presently disclosed non-limiting embodiment, they are alternated on the table 3 at angular positions equally spaced from each other.

For example when eight vertical workpiece spindles 4 and eight horizontal workpiece spindles 104 are provided on the same table 3, each vertical workpiece spindle 4 is angularly spaced by 22.5 degrees with respect to the two neighbouring horizontal workpiece spindles 104.

In the shown embodiment, the drive motors 11, 111 (one for each of said vertical and horizontal workpiece carrying spindles 4, 104), are all supported on the rotating table 3.

In another, not shown but easily conceivable arrangement, drive motors 111 for driving in rotation the horizontal workpiece carrying spindle 104 can be supported on said rotating table 3 and drive motors for driving in rotation the vertical workpiece carrying spindle 4 can be mounted external to said rotating table 3.

Since machine 1000 has features similar to those of machines 1 and 100 combined together, these features will not be again described here for the sake of conciseness.

The configuration of machine 1000 allows too pre-machining of pieces from bars and simultaneous machine finishing from three sides in the same and one machine only.

According to the disclosure, a machining method is provided that comprises the following steps:

a—a loading step in which a bar is inserted in an horizontal workpiece carrying spindle 104 and cut to provide at least one workpiece;

b—an indexing rotation step for rotation of the rotating table 3 of the rotary indexing machine 1000 by an angle that corresponds to the double of the one between two machining stations 9 to position a workpiece carrying spindle 4, 104 at a said machining station;

c—a machining step in which the workpiece clamped in the horizontal workpiece carrying spindle is machined in the machining station 9 reached at step b;

d—optionally repeating steps b and c up to the total number divided by two less one, of the working stations 9 installed in the machine 1000;

e—transferring the workpiece from a horizontal workpiece carrying spindle 104, by the cutting off of the machined bar end, to a vertical workpiece carrying spindle 4;

f—an indexing rotation step for rotation of the rotating table 3 of the rotary indexing machine 1000 by an angle that corresponds to the double of the one between two machining stations 9;

g—a machining step in which the workpiece clamped in the vertical workpiece carrying spindle is machined in the machining station 9 reached at step f;

h—optionally repeating steps f and g up to the total number divided by two less one, of the working stations 9 installed in the machine 1000;

i—an unloading step in which the workpiece is extracted from the vertical workpiece carrying spindle 4.

At step i, optionally, a preliminary cutting of the workpiece is performed.

In this way, referring for purposes of simplicity of disclosure to a single workpiece, a first and a second machining steps of said workpiece are carried out: namely, after the loading step (step a) the first step comprises machining the workpiece in an horizontal position, in the horizontal spindle 104 at all odd (or even) position machining station 9; after the first step, the second machining step is performed, comprising machining the workpiece in a vertical position, at all vertical spindle 4 at even (or odd) machining station 9.

Optionally, a workpiece transfer may be carried out where the machining step c is not performed, except for the mentioned cutting off (step e).

Machining operations are preferably carried out simultaneously at every station 9 of the machine 1000.

Preferably, machining in a first step is mainly carried out by way of fixed tools and rotating spindles, while the machining in a second step is mainly done by rotating tools and indexed workpiece.

In this way, both of the advantages already discussed for the machine 1 and 100 are provided. Still further, machining from three different directions and the simultaneous workpiece rotation for turning or positioning, both in first and second phase are enabled that give flexibility and productivity to the production process.

Furthermore, it is possible to machine very complex parts in only one machine instead of two or more, avoiding semi-finished parts handling.

The disclosure thus conceived is susceptible of numerous modifications and variations, all of which are within the scope of the appended claims. Moreover, all the details may be substituted by other, technically equivalent elements.

In practice the materials employed, provided they are compatible with the specific use, and the contingent dimensions and shapes, may be any according to requirements and to the state of the art.

The invention claimed is:

1. A rotary indexing transfer machine comprising:
   a machine frame;
   a rotating table, supported on said machine frame so as to rotate about an indexing axis;
   at least one workpiece carrying spindle comprising a hollow shaft for receiving therein a workpiece and a clamping device for clamping the workpiece inserted in said hollow shaft,
   wherein said clamping device comprises a collet that is coupled to the workpiece carrying spindle,
   wherein said workpiece carrying spindle is mounted on said rotating table, and
   wherein said hollow shaft and said collet of said at least one workpiece carrying spindle are connected for joint rotation about a spindle rotation axis;
   at least one support provided in fixed position next to said rotating table, said fixed position setting up a work station;

at least one machining station having at least one machining unit supported on said support so as to allow machining of the workpiece clamped in said collet at said work station;

at least one drive motor for rotating said hollow shaft and said collet about said spindle rotation axis; and an indexing device mounted on the machine frame and comprising indexing means for rotary indexing of the rotating table so as to position the at least one workpiece carrying spindle at a respective said work station, wherein said at least one drive motor is mounted on said rotating table in a position such as to allow machining of the workpiece, clamped in said collet, from two axially opposite machining directions and from a radial machining direction, and wherein said indexing means are actuatable in an operative indexing arrangement for rotary indexing of the rotating table and in a non-operative arrangement in which they allow machining of the workpiece, clamped in said collet, from two axially opposite machining directions and from a radial machining direction, wherein said drive motor comprises a rotatable motor shaft having a shaft rotation axis substantially parallel to said spindle rotation axis, motion transmission means being provided between said motor shaft and said workpiece carrying spindle for transmitting a motor torque from said motor shaft to said workpiece carrying spindle, wherein said workpiece carrying spindle is provided with a collar seat, said collar seat extending vertically and/or horizontally between opposite sides of said rotating table, a through hole being provided in said collar seat for allowing a workpiece being clamped by said collet to be accessible from both said opposite sides of said rotating table, whereby to allow machining of the workpiece from axially opposite machining directions.

2. The rotary indexing transfer machine according to claim 1, wherein said indexing axis is vertical and said spindle rotation axis is either vertical or horizontal.

3. The rotary indexing transfer machine according to claim 1, comprising a clamping actuation device, such as spring means and/or hydraulic cylinder, for actuating clamping action of said collet.

4. The rotary indexing transfer machine according to claim 1 wherein said at least one support is fixedly mounted on said machine frame.

5. The rotary indexing transfer machine according to claim 1, wherein said machining station comprises at least a first, a second, and a third machining unit, each machining unit being provided with at least one respective tool spindle or fixed tool holder for holding at least one a respective tool, said tool spindles of the first and a second machining unit being located at opposite sides of said rotating table to substantially face each other so as to allow machining of the workpiece from opposite machining directions substantially parallel to said spindle rotation axis, said tool spindle of the third machining unit being provided radial with respect to said spindle rotation axis.

6. The rotary indexing transfer machine of claim 5, wherein at least one among said first, second and third tool spindles or fixed tool holder is arrangeable in a tilted position for machining the workpiece along a machining direction inclined with respect to said second axis.

7. The rotary indexing transfer machine according to claim 3, further comprising a loading/unloading station provided with a said clamping actuation device, said loading/unloading station being provided in fixed position next to said rotating table.

8. The rotary indexing transfer machine according to claim 1, comprising a plurality of workpiece carrying spindles, a plurality of drive motors a plurality of station supports, and a plurality of machining stations and a plurality of machining units, each of said drive motors being supported on said rotating table.

9. The rotary indexing transfer machine according to claim 1, wherein said indexing means comprise a flange to which a floating Hirth ring is attached for cooperation with a rotating Hirth ring coupled to the rotating table and with a fixed Hirth ring connected to a main machine support, wherein said flange is actuatable for vertical movement to provide engagement or disengagement of the floating Hirth ring with or from the rotating and fixed Hirth rings.

10. The rotary indexing transfer machine according to claim 8, wherein the workpiece carrying spindles are mounted horizontally on said rotating table, along radial directions thereof, the respective spindle rotation axes thereof being perpendicular with respect to said indexing axis.

11. The rotary indexing transfer machine according to claim 1, wherein the, or each drive motor is mounted on said rotating table with the rotatable motor shaft having the shaft rotation axis horizontal and parallel to said spindle rotation axis.

12. The rotary indexing transfer machine according to claim 1, wherein the, or each drive motor is mounted on said rotating table with the rotatable motor shaft having the shaft rotation axis vertical and parallel both to said indexing and spindle rotation axis.

13. The rotary indexing transfer machine according to claim 1, comprising, mounted on said rotating table, at least one vertical and one horizontal workpiece carrying spindle, said vertical and horizontal workpiece carrying spindles being rotatable about spindle rotation axes thereof that are, respectively, vertical and horizontal.

14. The rotary indexing transfer machine according to claim 13 comprising drive motors, one for each of said vertical and horizontal workpiece carrying spindles, said drive motors being supported on said rotating table.

15. The rotary indexing transfer machine according to claim 13, comprising drive motors, one for each of said vertical and horizontal workpiece carrying spindles, wherein the drive motor for driving in rotation the hollow shaft and collet of said horizontal workpiece carrying spindle being supported on said rotating table and the drive motor for driving in rotation the hollow shaft and collet of said vertical workpiece carrying spindle being mounted external to said rotating table.

16. The rotary indexing transfer machine according to claim 1, configured such that collet rotation remains active during gradual rotational movement of the rotating table among said work stations and indexing of the workpiece carrying spindles at the respective work stations.

17. The rotary indexing transfer machine as set forth in claim 5, configured to allow machining of a workpiece in each said work station, either simultaneously or sequentially, by way of three machining units.

18. A machining method using a rotary indexing machine as set forth in claim 1, the method including the following steps:
a—a loading step in which a bar is inserted in an horizontal workpiece carrying spindle and cut to provide at least one workpiece;

b—an indexing rotation step for rotation of a rotating table of the rotary indexing machine by an angle that corresponds to the double of the one between two machining stations to position a workpiece carrying spindle at a said machining station;
c—a machining step in which the workpiece clamped in the workpiece carrying spindle is machined in the machining station reached at step b;
d—optionally repeating steps b and c up to the total number divided by two less one, of the working stations installed in the machine;
e—transferring the workpiece from a horizontal workpiece carrying spindle to a vertical workpiece carrying spindle;
f—an indexing rotation step for rotation of the rotating table of the rotary indexing machine by an angle that corresponds to the double of the one between two machining stations;
g—a machining step in which the workpiece clamped in the workpiece carrying spindle is machined in the machining station reached at step f;
h—optionally repeating steps f and g up to the total number divided by two less one, of the working stations installed in the machine; and
i—an unloading step in which the workpiece is extracted from the vertical workpiece carrying spindle.

\* \* \* \* \*